INVENTOR.
C. S. KELLEY

Nov. 24, 1959 C. S. KELLEY 2,914,388
HEAT EXCHANGER WHICH FORMS THE SOLE FLUID DISTRIBUTION
MEANS IN A CATALYST REGENERATOR
Filed Feb. 14, 1955 2 Sheets-Sheet 2

INVENTOR.
C. S. KELLEY
BY
Hudson & Young
ATTORNEYS

United States Patent Office 2,914,388
Patented Nov. 24, 1959

2,914,388

HEAT EXCHANGER WHICH FORMS THE SOLE FLUID DISTRIBUTION MEANS IN A CATALYST REGENERATOR

Carl S. Kelley, Bartlesville, Okla., assignor to Phillips Petroleum Company, a corporation of Delaware Application February 14, 1955, Serial No. 488,035

5 Claims. (Cl. 23—288)

This invention relates to a method for contacting fluids with solids. In one aspect, this invention relates to a method for effecting temperature control and distribution of flow of catalyst particles in a catalyst regeneration zone. In another aspect, this invention relates to a method for effecting control of regeneration temperature in a catalyst combustion regeneration zone by removing a sufficient amount of heat from incoming hot catalyst and combustion-supporting gas so as to preclude development of temperatures during said regeneration at which thermal deactivation of catalyst takes place at an unduly high rate. In another aspect, this invention relates to a method for controlling temperature of catalyst regeneration, and for effecting uniform distribution of catalyst, in a catalyst combustion regeneration zone, by passing hot catalyst and combustion supporting gas prior to introducing same into the regeneration zone, in indirect heat exchange contact relation with cool heat exchange fluid disposed across the path of flow of catalyst and gas contacted therewith so as to remove heat in an amount sufficient to preclude development of undesired high regeneration temperatures and so as to cause uniform distribution of particles of catalyst, by the said indirect contact, throughout the zone of regeneration. In another aspect, this invention relates to a method for effecting control of temperature, and for uniform distribution, of a mixture of fluidized catalyst and carrying fluid in a contacting zone by passing such a mixture of fluidized catalyst and carrying fluid, prior to introduction of same into the said zone, in indirect heat exchange contact relation with a heat exchange fluid passed as at least one stream along a plurality of spaced apart paths disposed across the flow of fluidized catalyst into the said contacting zone so as to effect the said heat exchange while at the same time causing, by said indirect contact, a uniform distribution of catalyst particles in the said carrying fluid and therefore, for uniform distribution of said catalyst in the contacting zone. In another aspect, this invention relates to a method for effecting heat removal from a hot fluidized catalyst-air admixture by injecting excess cool air into said stream so as to control temperature of subsequent regeneration. In another aspect, this invention relates to a method for effecting heat removal from a fluidized catalyst-air admixture by injecting excess cool catalyst particles into said stream so as to control temperature of subsequent regeneration. In another aspect, this invention relates to apparatus comprising a shell including heat extraction means for removing heat from a fluidized solids mass to be passed downstream in said shell, and means associated with said heat-extraction means for causing uniform distribution of solids downstream from said heat extraction. In another aspect, this invention relates to apparatus comprising a shell containing heat extraction means comprising a pair of heat exchange fluid headers and conduits connected therewith and intermeshed so as to form a grid through which a solids stream can be passed for heat transfer and distribution downstream.

When contacting solids with fluids in a solids-fluid contacting zone such as in a fluid catalyst conversion zone or a fluid catalyst regeneration zone, it is desirable to effect uniform distribution of solids and to preclude temperatures that are so high or so low as to be undesirable. Thus, in a process for regenerating catalyst at least partially spent, e.g., coke contaminated, in the presence of an oxygen-containing regeneration gas such as air, it is important to effect uniform gas-catalyst distribution within the regeneration vessel in order to effect uniform combustion of the carbonaceous materials on the catalyst surfaces and to produce a regenerated catalyst of uniform low coke content. Further, it is desirable to prevent a build-up of heat produced by the exothermic regeneration reaction (combustion regeneration) and resulting excessively high temperatures within the regeneration zone which cause thermal deactivation of the catalyst through overheating.

This invention is concerned with process and apparatus for effecting temperature control in such a solids-fluid contacting zone and also for effecting uniform distribution of solids in such a zone.

In accordance with this invention a method is provided for preventing development of excessive temperatures in a catalyst combustion regeneration zone into which hot catalyst to be regenerated, and hot combustion-supporting gas are introduced, which comprises removing a sufficient amount of heat from the said hot catalyst and hot gas prior to the introduction of same into the regeneration zone, so as to preclude development of such excessive regeneration temperatures.

Further in accordance with this invention, a method is provided for effecting uniform distribution of catalyst in a catalyst regeneration zone into which a preheated mixture of catalyst and combustion-supporting gas is introduced under combustion conditions, while at the same time preventing development of excessive temperatures in the regeneration zone which cause thermal deactivation of catalyst therein which method comprises passing the said catalyst mixture, prior to introduction of same into the zone of regeneration, in indirect heat exchange contact relation with a cooler fluid passed along a plurality of paths disposed in spaced-apart relation across the path of flow of the said catalyst mixture into the regeneration zone, so as to uniformly distribute catalyst particles in said combustion-supporting gas as a result of said contact, and therefore to cause uniform distribution of the catalyst particles in the regeneration zone and so as to remove sufficient heat from said catalyst to preclude development of excessive temperature.

Further, in accordance with this invention, a method is provided for preventing development of excessive temperatures in a catalyst combustion regeneration zone into which a preheated mixture of catalyst and combustion supporting gas is introduced under combustion conditions which comprises removing a sufficient amount of heat from said catalyst mixture prior to introduction of same into the regeneration zone to preclude development of such excessive temperatures in the regeneration zone, by introducing into the said catalyst mixture a sufficient amount of excess cool air to effect said heat removal.

Further, in accordance with this invention, a method is provided for preventing development of excessive temperatures in a catalyst combustion regeneration zone into which a preheated mixture of catalyst and combustion-supporting gas is introduced under combustion conditions which comprises removing a sufficient amount of heat from said catalyst mixture prior to introduction of same into the regeneration zone to preclude development of such excessive temperatures in the regeneration zone, by introducing a sufficient amount of cool additional catalyst into said catalyst mixture to effect said heat removal.

Still, in accordance with this invention, a method is provided for effecting uniform distribution of catalyst in a fluidized catalyst-fluid contacting zone and for effecting control of temperature therein, comprising passing a stream of the said catalyst and said fluid into the contacting zone, passing a heat exchange fluid as at least one stream along a plurality of spaced-apart paths disposed across the flow of said stream of fluid and catalyst into the contacting zone, in indirect heat exchange relation with the catalyst-fluid mixture so as to uniformly subdivide catalyst particles in the fluid in admixture therewith to thereby cause uniform distribution of catalyst in the contacting zone, and at the same time to effect said heat exchange prior to introducing the catalyst into the said zone.

Further, in accordance with this invention, apparatus is provided comprising an upright shell; a first conduit means for admitting fluid into said shell; a second conduit means for withdrawal of fluid from the said shell; and heat exchange means transversely closing said shell intermediate said first and second conduit means, and containing uniformly distributed openings adapted to permit upward flow of fluid therethrough from said first conduit means to said second conduit means.

Further, in accordance with this invention is provided apparatus suitable for regeneration of catalyst, and for treatment of catalyst and combustion-supporting gas to be charged to the said regeneration, comprising an upright shell; a first header disposed in a lower and central portion of said shell, containing separate sections for conducting flow of separate fluid streams; a plurality of conduits extending radially from said first header, each conduit being shaped so as to connect at one end with one of said first header sections and at the other end with another of said first header sections so as to convey fluid from one of said sections to another; conduit means connecting each of said first header sections with points outside said shell; a second header in said shell, disposed about an inner lower periphery of said shell, containing separate sections for conducting flow of separate fluid streams; a plurality of conduits extending laterally from said second header, each connecting at one end with one of said second header sections and at the other end with another of said second header sections so as to convey fluid from one of said second header sections to the other; conduit means connecting each of said second header sections with points outside said shell; and said radially and laterally extending tubes being disposed in close proximity to each other.

My invention is further illustrated with reference to the attached drawings.

Figure 1:
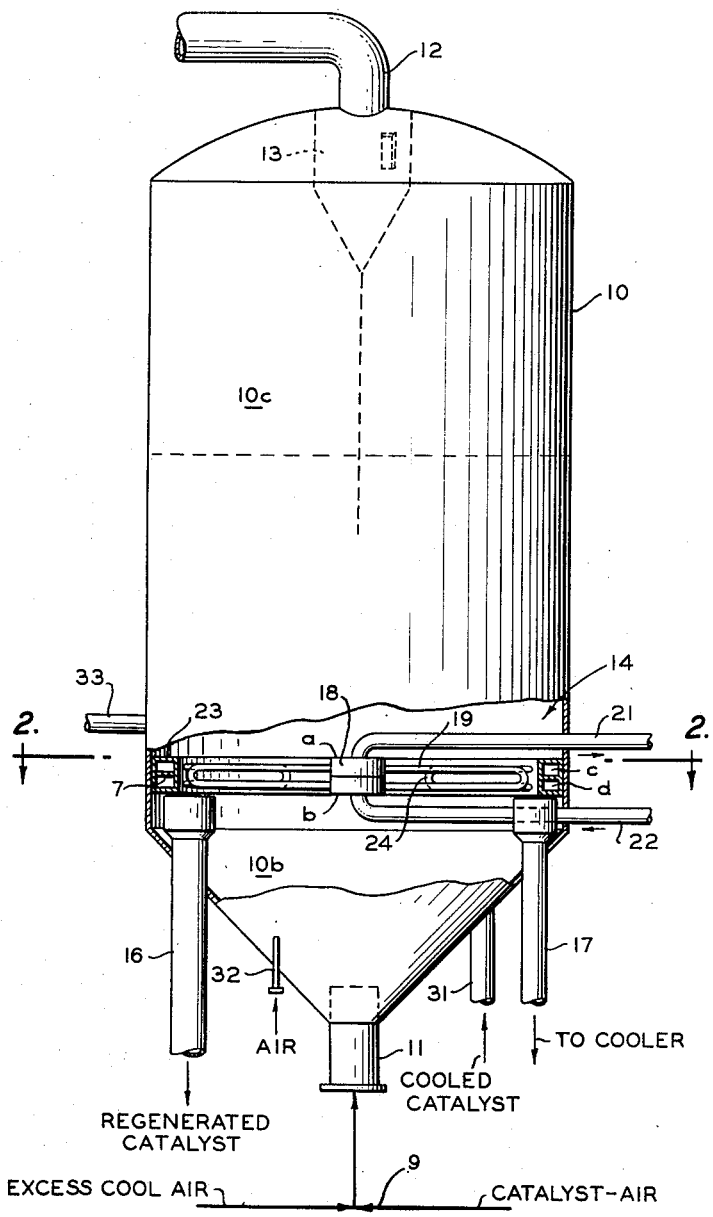
Figure 1 is illustrative of a regeneration vessel containing a grid-type heat exchange flow distribution element of this invention and is further illustrative of a method of this invention for effecting uniform distribution of catalyst particles and for effecting control of catalyst temperature.
Figure 2:
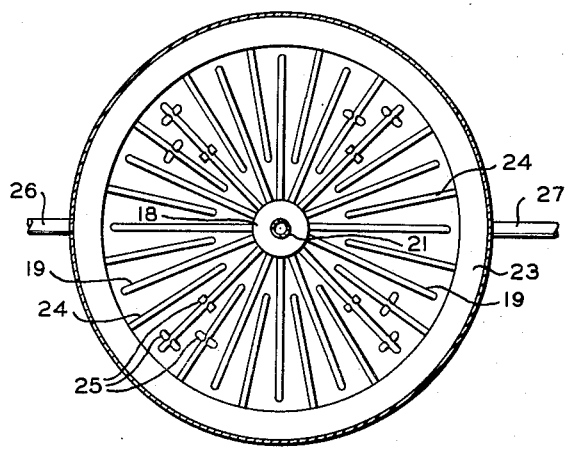
Figure 2 is a plan view of the grid-type heat exchange element of Figure 1, taken along the line 2—2 of Figure 1.
Figure 3:
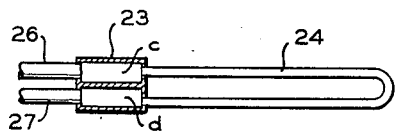

Figure 3 shows a front view of heat exchanger assembly 23 of Figure 1 with one of the tubes 24 associated therewith. As shown in Figure 2, the tubes 24 and tubes 19 of Figure 1 are arranged in close proximity to the other so as to form a grid-type heat exchanger element.

Figure 4:
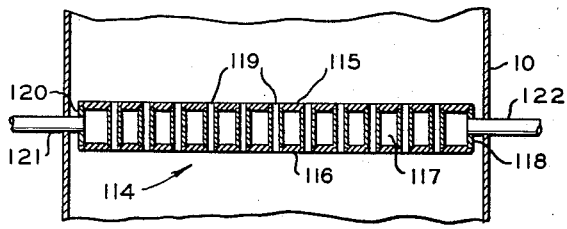

Figure 4 shows another form of grid-type heat exchange flow distribution element of this invention and is further illustrative of method of this invention for effecting uniform distribution of catalyst particles and for effecting control of temperature of catalyst.

Figure 5:
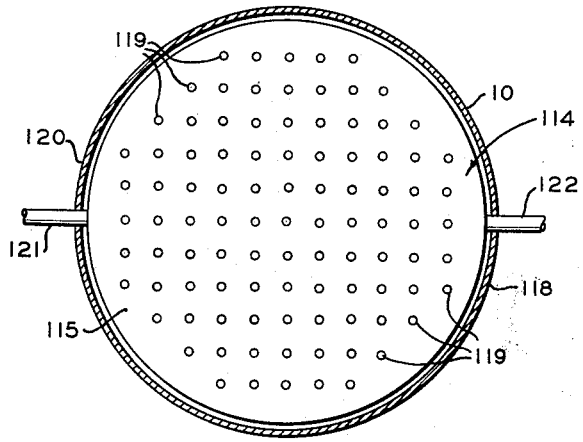

Figure 5 is a plan view of grid-type heat exchange element 114 of Figure 4. The structures of Figures 4 and 5 are further illustrated with reference to use of same in the regeneration vessel 10 of Figure 1.

With reference to the drawings, Figure 1, catalyst regeneration chamber 10 is provided with catalyst-air conduit inlet means 11, with outlet conduit means 12, and with cyclone separator 13 associated with conduit 12 for removing catalyst particles from chamber effluents withdrawn via line 12.

In a lower central portion of chamber 10, preferably near the inlet end, is provided a grid-type heat exchanger unit 14, supported above regenerated catalyst removal conduit 16 and recycle catalyst removal conduit 17. Header assembly 18 comprises sections $a$ and $b$ for conducting flow of separate streams of heat exchange fluid. A plurality of tubes 19 extend radially from header 18, connecting at one end with one of sections $a$ and $b$ and at the other end with the other of sections $a$ and $b$ so as to convey fluid from one of those sections to the other. Conduit 21 connects section $a$ with a point outside chamber 10 and conduit 22 connects section $b$ with a point outside chamber 10.

Header assembly 23 is disposed about the inner periphery of chamber 10 and contains separate sections $c$ and $d$ for conducting flow of separate fluid streams. Tubes 24 (Figures 2 and 3) extend laterally from header 23, each connecting at one end with one of sections $c$ and $d$ and at the other end with the other of sections $c$ and $d$ so as to convey heat exchange fluid from one of sections $c$ and $d$ to the other. Conduits 26 and 27 (Figures 2 and 3) connect sections $c$ and $d$, respectively, each with a point outside chamber 10.

Radially extending tubes 19 are in this embodiment preferably intermeshed with laterally extending tubes 24 so as to form, together with associated elements, the grid-type element 14.

It is a feature of this invention that the grid-type heat exchanger element 14 renders unnecessary, and replaces, the conventional grid-type distribution means employed in effecting uniform distribution of catalyst in fluid-catalyst contacting vessels in the art. I have found that this structure provides for more open space than is afforded in the conventional grid-type distribution means and that this structure, nevertheless, provides for an efficient distribution of catalyst throughout the vessel, such as the regeneration vessel herein, with concomitantly lowered pressure drop across the distribution means 14, i.e., than achieved when employing conventional distribution grids. Accordingly, the over-all pressure drop, across chamber 10, is markedly lower than that in fluid-catalyst contacting vessels in the art employing internal heat exchange means disposed in the upper central portion of the chamber in conjunction with conventional catalyst distribution means above discussed. Thus, element 14, as a single element in lieu of a conventional grid-type element and downstream heat exchange means, provides for uniform distribution of catalyst in the contacting zone and for an efficient control of temperature therein at markedly reduced pressure drop across the zone. This feature is particularly important because it provides for an elimination of equipment and power requirements otherwise required when operating at a higher pressure drop.

In the operation of this embodiment, a mixture of fluidized catalyst from a fluidized catalytic hydrocarbon conversion process, at least partially spent by presence of carbonaceous deposits and other undesirable materials on its surfaces, and air, is preheated, as required (not shown), to a temperature sufficiently high, to initiate combustion regeneration in chamber 10, zone 10c, and is passed into chamber 10 via line 9. The temperature of catalyst in line 9 is at a level such that some combustion regeneration takes place. This combustion, although it results in some regeneration, i.e., burning of carbonaceous material from the catalyst particle surfaces, in line 9, causes a development of temperature in line 9 such that, if a portion of the heat in catalyst-air in line 9 is not removed prior to passing the said catalyst-air mixture into regeneration zone 10c, the heat of incoming catalyst-air, in addition to that developed exothermically in regeneration zone 10c, will be so great as to develop a temperature at a level so high that the catalyst will be damaged, i.e., due to overheating in regeneration zone 10c, causing thermal deactivation of the catalyst to an unduly large extent.

When employing conventional grid-type distribution means, as discussed hereinabove, a somewhat higher pressure drop is generally encountered. In other words, it is due to the type of arrangement of heat exchange conduits, in accordance with this embodiment, that an efficient distribution of particles downstream therefrom can be achieved while still taking advantage of the additional free space provided and the concomitantly lowered pressure drop across the heat exchanger element. Similarly, as above discussed, temperature control, ordinarily employed by using an internal heat exchanger in the contacting zone downstream from the conventional distributing means, is achieved by the single heat exchanger element 14 of this embodiment thereby providing for the reduction in the number of pieces of equipment within chamber 10 and a marked reduction in over-all pressure drop across chamber 10. Thus, use of external coolant such as solids from line 17, as described hereinafter, can be employed or dispensed with as desired.

Hot catalyst-air mixture from line 9 is passed upwardly into the bottom portion of chamber 10 into and through grid-type heat exchanger element 14 in indirect heat exchange contact relation with cooling fluid circulated through element 14, and is cooled to an extent providing for removal of sufficient heat to prevent development of temperatures in zone 10c that are so high that thermal deactivation of the catalyst takes place to an unduly large extent, but permitting temperatures sufficiently high for maintaining regeneration. Regeneration gas is passed via cyclone separator 13 into line 12 for withdrawal from the system. Regenerated catalyst is withdrawn from the system via conduit 16.

The amount of heat that can be removed, in accordance with the operation of this embodiment, can be varied over a wide range. Thus, when charging via conduit 11, the catalyst withdrawn from a hydrocarbon fluid catalytic cracking step, is at a temperature generally of from about 850 to 980° F., and when mixed with air, the latter preheated at a temperature of about 150 to 300° F., generally about 200–300° F., resulting admixture initiates combustion regeneration prior to reaching zone 10c, and it is generally necessary to remove heat in an amount sufficient to reduce the temperature of catalyst-air emerging from element 14, by an amount of from about 10 to 150° F., generally about 50–150° F., so that the regeneration proper takes place at a temperature of about 1000 to 1100° F., the maximum temperature in this range being below that at which overheating takes place in the regeneration zone to deactivate the catalyst and therefore reduce its activity for reuse in the catalyst step from which it was withdrawn.

Obviously, the specific temperatures to be employed and the amount of heat to be removed from the hot catalyst-air mixture prior to passing same into the regeneration zone proper is dependent upon the specific catalyst employed, and upon the temperature of the conversion step from which it is withdrawn.

In another embodiment, additional heat removal from catalyst-air admixture charged via line 11 can be effected by introducing relatively cool catalyst into the catalyst-air mixture, such as via conduit 31, which charges catalyst initially withdrawn via line 17, passed to a cooler and returned to line 31, or by introduction of such cooled catalyst into zone 10c via line 33.

In another embodiment, excess cool air can be introduced into contact with hot catalyst-air introduced into zone 10b from conduit 11, via conduit 32 to provide for absorption of heat and for the desired heat removal prior to charging the catalyst-air to the regeneration zone 10c.

The proportions of excess cool air and/or cool catalyst utilized, as described hereinabove, to remove heat from catalyst-air to be charged to regeneration zone 10c, are, of course, dependent upon the extent of cooling required, and the specific materials concerned.

With reference to Figure 4 grid-type heat exchange element 114 disposed in a lower portion of chamber 10 of Figure 1, comprises plate 115 substantially closing shell 10 and disposed above plate 116 in spaced apart relation to form enclosure 117, described hereinafter, plate 116 also substantially closing shell 10. Plates 115 and 116, in a preferred embodiment, are substantially horizontal and are substantially parallel. Plates 115 and 116 together with closure members 118 and 120 form enclosure 117. Upright conduits 119 connect plates 115 and 116 and extend through those plates and terminate, preferably, flush with the external sides of those plates. Conduit 121 in a side wall of member 114, such as in side wall 120, provides for flow of heat exchange fluid into enclosure 117 in indirect heat exchange contact relation with material in conduits 119. Conduit 122 in a side wall of element 114 is spaced from conduit 121 so as to permit withdrawal from enclosure 117 of heat exchange fluid initially from conduit 121 and utilized as coolant.

In a now preferred form conduits 119 are shaped as venturis so as to facilitate intermixing of catalyst and carrying-fluid to effect more uniform distribution of catalyst and fluid whereby to effect more uniform transfer of heat from the catalyst to the cooling agent passed in indirect contact relation therewith.

Although I have illustrated a specific embodiment of apparatus and process by which heat removal can be achieved, as discussed herein, i.e., from hot catalyst-air prior to passing the same to regeneration, my invention in its broadest aspect is in the concept of removing heat from such catalyst-air mixtures prior to regeneration of the said catalyst, so as to preclude development of temperatures in the regeneration step at which thermal deactivation of the catalyst takes place to an unduly large extent. It is to be understood, therefore, that similar embodiments of structure or pattern of heat exchanger unit-distributor means 14 or 114 can be employed. Thus, heat exchange tubes in shape of a spiral, or U-shaped tubes, extending horizontally and perpendicularly from a centrally located header such as header 18, can be employed. This feature of the invention is in the concept of utilizing a combined heat exchanger and catalyst distribution element so as to reduce over-all pressure drop across the system with concomitant elimination of equipment and power requirements otherwise necessary. This latter concept provides for heat exchange to prevent thermal deactivation of the catalyst, and catalyst-gas distribution, to insure uniform coke removal and production of a regenerated catalyst with uniform coke content, concomitantly.

It is a feature that the grid-type heat exchanger elements of this invention illustrated by element 14 of Figure 1 and element 114 of Figures 4 and 5 can also be employed in conjunction with operation of other catalyst-fluid contacting systems such as a fluidized catalytic conversion system. Thus, element 14 or element 114, i.e., those specific structures, or any grid-type heat transfer-distribution means of this invention, can be employed to introduce additional heat into an oil-catalyst mixture just prior to introduction of the latter into a fluidized catalytic conversion zone to supply heat to the said mixture, lost during endothermic cracking that takes place intermediate the preheating of the oil-catalyst mixture and the cracking step, proper. In that embodiment the heat exchange liquid circulated through the combined heat exchange catalyst distribution element would be preheated to a sufficiently high level to offset that heat lost endothermically. In such an embodiment, a suitable heat transfer medium is such as molten metals and molten salts, such as molten lead, and molten sodium chloride, molten mixed salts such as BKF₄, or the like, which would, in most instances, be necessarily heated to a temperature in the range of about 950 to 1150° F., depending, of course, upon the specific oil cracking process employed, such processes generally being conducted in the range of from about 890 to 940° F.

Although, in a broad aspect, this invention provides for removal of heat from a catalyst-combustion gas mixture prior to charging the said mixture to regeneration, it is to be understood that one or both the catalyst and/or combustion gas can be separately subjected to heat removal prior to entry as a mixture into the regeneration zone, whereby the extent of "prior" combustion is controlled to a temperature level precluding development of excessive temperatures in the regeneration zone.

In another feature of this invention, baffles 25 can be affixed to all or any one or more of tubes 19 and/or 24 in order to provide an increased turbulence in the flow of fluid upwardly through the peripheral areas in element 14, when desired, to further facilitate catalyst-fluid admixture and catalyst distribution in zone 10c. However, satisfactory distribution of catalyst in zone 10c can be effected without the use of any one or more of baffles 25. In any event, although baffles 25 are of such dimensions that although the effect of these elements on pressure drop across element 14 is appreciable, nevertheless, the overall pressure drop across element 14 when employing one or more of baffles 25 is markedly lower than that across conventional grid distribution plates employed in the prior art.

Any baffle 25 can be a plate member affixed to a specific heat exchange conduit 19 or 24 laterally disposed in a direction toward an adjacent heat exchange conduit. However, any baffle member 25, when desired, can form a part of the heat exchange conduit 19 or 24 and thereby serve concomitantly as supplemental heat exchange surface.

Reasonable variation and modification are possible within the scope of the foregoing disclosure, drawings, and the appended claims to the invention, the essence of which is that (1) heat is removed from a hot catalyst-air mixture undergoing combustion prior to introduction of same to combustion regeneration, to preclude development of regeneration temperatures at which the catalyst is overheated and thereby thermally deactivated; (2) in the introduction of a mixture of fluidized catalyst and a carrying fluid into a catalyst contacting zone under conditions providing for uniform catalyst distribution in the said zone under predetermined temperature conditions, a stream of the said catalyst and fluid is passed into the zone subsequent to passing same in heat exchange relation, indirectly, with a heat exchange medium dispersed across the path of catalyst-carrier fluid flow so as to uniformly distribute the catalyst particles throughout the carrying fluid and thereby, in the contacting zone, while at the same time effecting heat exchange to facilitate maintenance of the predetermined temperature conditions in the contacting zone; (3) apparatus comprising a shell, a plurality of plates, spaced apart, and substantially closing said shell, means associated with said plates to form an enclosure in said shell, a plurality of conduits in said enclosure, each connecting said plates and passing through the same, and conduit means for passing fluid through said enclosure; and (4) apparatus comprising an upright shell, a first conduit means for admitting fluid into the shell, a second conduit means for withdrawal of fluid from the shell, heat extraction means transversely closing the shell intermediate the first and second conduit means and containing uniformly distributed openings adapted to permit upward flow of fluid therethrough from the first conduits to the second conduits, apparatus in a now preferred form including, as the said heat extraction means, a plurality of conduits in a lower portion of the said shell, disposed transversely across a central portion thereof in spaced-apart relation to form said openings, together with means for passing heat exchange fluid through the said conduits in indirect communication with the interior of the said shell.

I claim:

1. An upright shell; a first header assembly disposed in a lower and inner portion of said shell, containing separate sections for conducting flow of separate fluid streams; a plurality of conduits extending radially from said first header assembly, each conduit being shaped so as to connect at least one end with one of said header sections and at the other end with another of said header sections, so as to convey fluid from one of said sections to another; conduit means connecting each of said first header sections with points outside said shell; a second header assembly in said shell, disposed about an inner lower periphery of said shell containing separate sections for conducting flow of separate fluid streams; a plurality of conduits extending laterally from said second header, each connecting at one end with one of said second header sections and at the other end with another of said second header sections, so as to convey fluid from one of said second header sections to the other; each of said previously recited conduits being disposed at the same horizontal level; conduit means connecting each of said second header sections with points outside said shell; and said radially and laterally extending conduits being disposed in close proximity to the other and thus collectively forming a fluid distribution means for fluid passing through the said shell, said fluid distribution means being the sole fluid distribution means in said shell.

2. Apparatus of claim 1 wherein said radially extending conduits extend to points in close proximity to said second header assembly and said laterally extending conduits extend to points in close proximity to said first header assembly and wherein said radially extending conduits are intermeshed with said laterally extending conduits.

3. In the apparatus of claim 2 a plate member affixed to at least one of said heat exchange conduits and disposed to extend laterally toward an adjacent heat exchange conduit.

4. In the apparatus of claim 2 a bend in at least one of said heat exchange conduits directed toward and then away from an adjacent heat exchange conduit.

5. Apparatus comprising a first horizontally disposed header assembly, containing separate sections for conducting flow of separate fluid streams; a plurality of conduits extending radially from said first header assembly, each conduit being shaped so as to connect at least one end with one of said header sections and at the other end with another of said header sections, so as to convey fluid from one of said sections to another; conduit means connecting each of said first header sections with external points; a second horizontally disposed header assembly disposed about an outer periphery of said first header assembly containing separate sections for conducting flow of separate fluid streams; a plurality of conduits extending laterally from said second header, each connecting at one end with one of said second header sections and at the other end with another of said second header sections, so as to convey fluid from one of said second header sections to the other; each of said previously recited conduits being disposed at the same general horizontal level; conduit means connecting each of said second header sections with external points; and said radially and laterally extending conduits being disposed in close proximity to the other and each being located at the same general horizontal level.

References Cited in the file of this patent

UNITED STATES PATENTS

| | | |
|---|---|---|
| 1,270,989 | Taliani | July 2, 1918 |
| 1,990,608 | Lucas | Feb. 12, 1935 |
| 2,422,081 | Cottrell | June 10, 1947 |
| 2,431,803 | Guyer | Dec. 2, 1947 |
| 2,433,798 | Voorhies | Dec. 30, 1947 |
| 2,444,990 | Hemminger | July 13, 1948 |
| 2,493,526 | Campbell et al. | Jan. 3, 1950 |
| 2,512,259 | Pike | June 20, 1950 |
| 2,518,270 | Barr | Aug. 8, 1950 |
| 2,536,099 | Schleicher | Jan. 2, 1951 |
| 2,561,408 | Peavy | July 24, 1951 |
| 2,565,513 | Morrison | Aug. 28, 1951 |
| 2,585,441 | Cornell | Feb. 12, 1952 |
| 2,619,451 | Ogorzaly | Nov. 25, 1952 |
| 2,650,155 | Medlin | Aug. 25, 1953 |
| 2,662,813 | Packie | Dec. 15, 1953 |
| 2,692,864 | Gerhold | Oct. 26, 1954 |
| 2,695,220 | Bergstrom | Nov. 23, 1954 |

FOREIGN PATENTS

| | | |
|---|---|---|
| 508,029 | Belgium | Jan. 15, 1952 |